Figure 1:
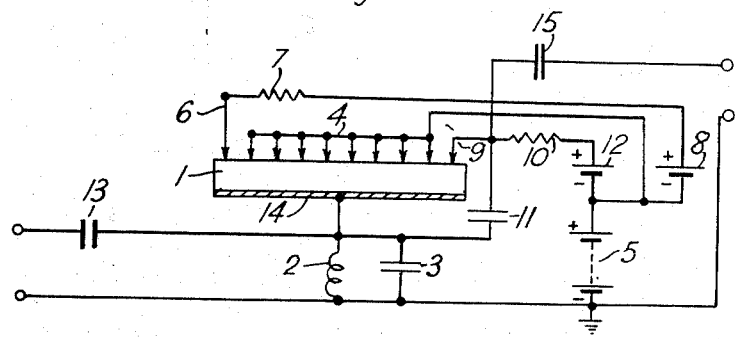

Nov. 13, 1956  A. H. REEVES ET AL  2,770,740
ELECTRIC COUNTING DEVICES AND CIRCUITS
EMPLOYING SEMI-CONDUCTORS
Filed Oct. 10, 1952

Inventor
A. H. REEVES-
R. B. W. COOKE
By
Attorney

2,770,740

ELECTRIC COUNTING DEVICES AND CIRCUITS EMPLOYING SEMI-CONDUCTORS

Alec Harley Reeves and Reginald Benjamin William Cooke, London, England, assignors to International Standard Electric Corporation, New York, N. Y.

Application October 10, 1952, Serial No. 314,062

Claims priority, application Great Britain October 12, 1951

8 Claims. (Cl. 307—88.5)

The present invention relates to electric pulse counting devices and circuits employing crystal rectifiers.

The rectifiers concerned are of the type comprising a suitable N-type semiconducting crystal such as N-type germanium, having in contact with its surface an electrode which may comprise a sharply pointed wire or cat whisker, or a thin metal film of small but appreciable area, which electrode forms the rectifying contact.

The arrangement employed may be similar to that described in co-pending application Serial No. 122,396, filed October 20, 1949, now Patent No. 2,655,607, granted October 13, 1953 in which a single semiconducting crystal is provided with a plurality of point contact electrodes arranged in a row or circle, and forming a corresponding number of separate point contact rectifiers on the same crystal. Each such rectifier forms part of a two-condition trigger circuit, and by means of a coupling effect between adjacent electrodes along or immediately below the surface of the crystal, each trigger circuit is effectively primed by the adjacent trigger circuit, so that successive pulses applied to the device are caused to switch over the trigger circuits in turn, one at a time. A single output pulse corresponding to a given number of input pulses may be obtained from the last trigger circuit.

According to one aspect of the present invention, each of the rectifiers of a multi-point counting device, consists of a rectifier of the kind which forms the subject of the invention covered by co-pending application Serial No. 314,061, filed October 10, 1952.

The invention accordingly provides an electric pulse counting device comprising a body of N-type semi-conducting material having a base electrode making low-resistance non-rectifying contact with one surface of the body, and a plurality of rectifying electrodes making rectifying contact with another surface of the body, each rectifying contact having been designed and electro-formed in such manner as to produce a forward voltage-current rectifying characteristic curve having at least one portion with a negative slope, and any pair of adjacent rectifying electrodes being so spaced that when the corresponding rectifying contacts are passing current in the forward direction, a change in current through one contact produces a change in current through the other.

The invention also provides counting circuits employing such counting devices.

As explained in the specification of the application already referred to, the rectifier is designed and electro-formed in such manner that when the rectifier is biased with a few volts in the forward or low resistance direction, a region of negative resistance is reached such that if the characteristic curve relating the voltage across the rectifier in the forward direction to the corresponding current passing through the contact is traced on a cathode ray oscillograph, for example, a discontinuity occurs in the curve which corresponds to a sudden change in the current. This means that as a result of the negative resistance, the current through the rectifier cannot stably assume any value within the gap, provided that the impedance of the sweeping source is less than the negative resistance slope, or that the characteristic is of the complex form shown in Fig. 3 of the application above referred to. Thus, if the rectifier be biased so that the current is nearly equal to that corresponding to one edge of the discontinuity, it can be switched over the value corresponding to the other edge of the discontinuity by the application of a pulse of suitable polarity and amplitude.

The advantage of the use of a rectifier of this type as a trigger device is that since it is operated in the low resistance condition, the internal time constant associated with the change in current is small and accordingly the device can be triggered at very high speed and by pulses of extremely short duration (e. g. 0.01 microsecond).

By the use of a multi-point counter consisting of a series of rectifying contacts arranged on the same crystal or semiconductor each separately designed and electro-formed in this particular way, it becomes possible to count trains of very short pulses repeated at frequencies of the order of 20 megacycles per second or more. No previous rectifier arrangements capable of operation at such speeds are known.

As already mentioned, the operation of the counting devices according to the invention depends on internal coupling between adjacent electrodes along or below the surface of the crystal. The counting action depends for its proper operation on the arrangement of the electrodes so that for any three electrodes of the series the degree of coupling between the first and second is greater than the degree of coupling between the first and third. Thus it becomes possible to arrange so that when one of the rectifiers is triggered by a pulse, it primes the immediately adjacent rectifier for triggering by the next pulse, but not the next-but-one.

As described in the specification of copending application Serial No. 314,061, filed October 10, 1952, the best results for each rectifier have been obtained using a crystal of N-type germanium and cat whisker electrodes consisting of silver containing about 0.1 percent of arsenic, each rectifier having been electro-formed by passing a large current through the contact in the forward or low resistance direction in a manner explained in detail in the specification just referred to. It will therefore be assumed that N-type germanium is used, in which case forward or low resistance bias will be produced by applying a positive potential to the cat whisker electrode with respect to the base electrode. It will be understood, however, that the invention is not necessarily restricted to the use of germanium, or of silver cat whisker electrodes. Any of the materials mentioned in the specification just referred to may be used, and the cat whisker electrodes may be replaced by small area metal films, as described therein.

In the description which follows, however, it will be assumed for clearness that N-type germanium is used and that all rectifiers mentioned have been designed and electro-formed in the manner described in the specification of co-pending application Serial No. 314,061, filed October 10, 1952.

It has been found that when the rectifiers are electro-formed in this manner, the coupling between two adjacent cat whiskers placed sufficiently close together on the same crystal is usually positive; that is, a given increase in current through one cat whisker causes a smaller increase in current through the other. Thus, when one rectifier has been triggered by an applied pulse to the high current condition, the adjacent rectifier (assumed, for example, to be in the low current condition) will be brought nearer to the critical condition corresponding to the lower edge of the gap, and may thus be primed so as to be triggered by a succeeding pulse.

For a reason not yet fully understood, and believed to be at least partly due to the quality of the germanium used, the coupling between two adjacent electrodes is sometimes found to be negative, in which case a decrease in current through the second rectifier is produced by triggering the first rectifier to the high current condition, and in this case, the second rectifier should be arranged to be in the high current conditions before priming, when the first is in the low current condition, and vice versa.

Any pair of adjacent cat whisker electrodes should be arranged to be from about 0.001 to 0.003 inch apart in order to obtain satisfactory coupling.

The coupling is believed to be mainly due to direct interaction between the currents of the two cat whiskers, rather in the manner which produces amplification in a crystal triode; and as already stated, it can be either positive or negative. An additional small voltage effect also exists, this being always negative, whereby the change in voltage across one contact which occurs when it is triggered affects the current through the other contact. As however, the resistances of both contacts are small this effect is small.

A different type of coupling due to high frequency oscillations is also possible. It has been found that a rectifier of the type with which the present invention is concerned, and biased in the forward direction to the negative resistance region, can be made to oscillate at frequencies up to about 300 megacycles per second by means of an appropriate external circuit. These oscillations are normally of only a few millivolts in amplitude, and can usually be neglected except in so far as they shift the voltages of the critical triggering points of the gap. When there is an increase of current in one rectifier there may be a corresponding shift in the critical triggering voltages of the adjacent rectifier, which is independent of the purely direct current effect previously explained. The shift in the triggering voltage may also be either positive or negative, and may either oppose or reinforce the direct current coupling, and may be of the same order of magnitude. A particular case was found in which the shift in triggering voltage, and the direct current coupling almost exactly neutralised each other although each, by itself, was relatively large.

As an example of the effect produced by the coupling, in a particular case it was found that the triggering of one rectifier caused an increase of current of about 0.1 milliamp through the adjacent rectifier (which was biased just below the lower critical current), and this is sufficient for stable counter operation.

In the case of a counting rectifier according to the present invention having an array of rectifying electrodes on the same crystal, it is necessary to ensure that when a train of pulses is applied, only one rectifier is triggered at a time. For this purpose, the coupling delay (that is, the time interval between the triggering of a rectifier, and the current change produced thereby in an adjacent rectifier) must be more than the duration of the triggering pulses. Measurements have shown that with cat whiskers spaced about 0.002 inch apart, the coupling delay is of the order of 0.05 microsecond, and this will be suitable for counting at speeds of about 20 megacycles per second, using input pulses having duration 0.03 microsecond or less.

Figure 2:
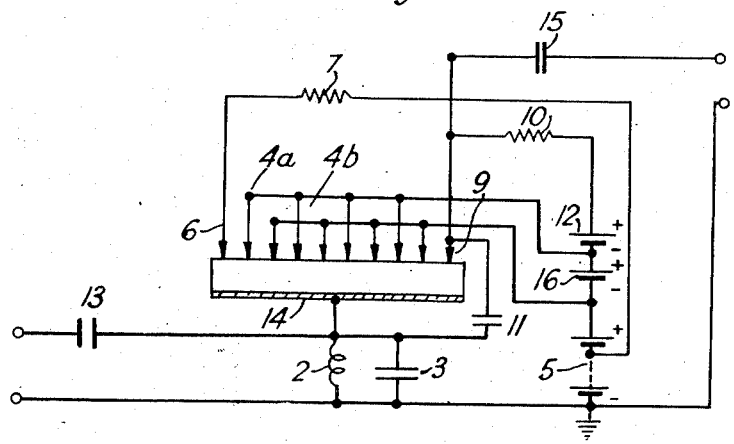

Two embodiments of the invention will be described in detail with reference to the accompanying drawing in which Figs. 1 and 2 respectively show schematic circuit diagrams of the embodiments. Fig. 1 shows an arrangement suitable for the case in which the coupling between adjacent electrodes is positive, while Fig. 2 shows an arrangement suitable for negative coupling.

In Fig. 1, a ten-point counting device comprises a strip or body 1 of N-type germanium, the upper edge of which has in contact therewith ten cat whisker electrodes equally spaced apart by from 0.001 to 0.003 inch, and forming ten rectifying contacts. The ten electrodes are conveniently but not essentially arranged in a straight line. It will be assumed that the electro-forming treatment described in the specification of application Serial No. 314,061, filed October 10, 1952, has been applied to each contact, the cat whiskers preferably consisting of silver containing 0.1 percent of arsenic.

A metal strip 14 plated on the lower edge of the strip 1 forms a base electrode common to all the rectifiers, and makes low resistance non-rectifying contact with the germanium.

The electrode 14 is connected to ground through the small high frequency choke coil 2, tuned by a capacitor 3 (which may be provided partly or wholly by the self-capacities of the coil and circuit) to a frequency between about 60 and 150 megacycles per second. The tuned circuit 2, 3 is employed for triggering the various rectifiers "on" or "off" in response to incoming pulses in the manner explained in detail in the co-pending specification already referred to.

The eight central electrodes 4 are connected in a group to a grounded positive potential source 5, of the order of 1 to 5 volts. The input electrode 6 is connected to source 5 through resistor 7 (normally several hundred ohms) and the extra positive source of potential 8 (normally a fraction of a volt); the electrode 6 is placed at one end of the group 4 as shown. The output electrode 9 is placed at the other end of the group, and is connected to source 5 through resistor 10 (normally several hundred to several thousand ohms) shunted by a capacitor 11 (normally about 50 micro-micro-farads) and an extra positive source 12 (normally about 10 to 30 volts). The tuned circuit formed by choke 2 and capacitor 3 should be damped so that appreciable amplitude of a wave train shock-excited in it lasts not more than about $\frac{1}{60}$ microsecond, which appears to be about the minimum time interval for any rectifier to be restored after triggering, or vice versa, thus ensuring that each such damped wave train will trigger or restore each rectifier but will not do both. If the circuit resistance effectively shunting the coil 2 is too large to produce the desired damping, an additional resistor (not shown) may be connected across the coil 2.

The rectifiers corresponding to the nine electrodes 6 and 4 should be electro-formed so as to have approximately equal characteristics, with a fairly small current difference (e. g. 3 milliamperes) between the two stable conditions (at constant voltage). Electrode 9 should be formed for a current difference between its two stable conditions (at constant voltage) rather more than ten times that of the other rectifiers—e. g. 50 milliamperes. It is assumed that the internal coupling between adjacent electrodes is positive and should be nearly equal for all, and that the rectifiers will be triggered from left to right in Fig. 1.

For convenience in what follows, any rectifier will be identified by the same designation numeral as the corresponding cat whisker electrode.

The voltages of the sources 5 and 12 should be adjusted so that all rectifiers except 6, when in the "off" or low current condition, and with the adjacent rectifier on the left in the "on" or high current condition, are within a small fraction of a volt of being triggered to "on"—e. g. 0.05 volt. Source 8 should be adjusted so that rectifier 6, when at "off" is in this same condition with all the other rectifiers at "off."

Operation of the circuit is as follows. With all rectifiers initially at "off," the first input pulse to be counted is applied to choke 2 through blocking capacitor 13. The pulse is arranged to produce a negative peak amplitude of about 0.1 volt from the damped train in 2, and the impedance of the tuned circuit 2, 3 when shunted by the input pulse source should be low enough in relation to the maximum impedance change of the germanium load circuit to keep this 0.1 volt nearly constant under all conditions. The input pulses applied through capacitor 13 may be either negative or positive; if the latter it is the second half cycle of the damped train in 2 that is operative instead of the first. An input pulse duration of 1/100 microsecond will be suitable for efficient shock excitation of the circuit 2, 3; such pulses may be obtained conveniently and simply from a single rectifier trigger device of the kind described in the specification of co-pending application Serial No. 314,061, filed October 10, 1952.

The first input pulse triggers rectifier 6 to "on" but no others, as all rectifiers except 6 require internal coupling from an adjacent electrode in the "on" position before they can be triggered by a peak of 0.1 volt. On arrival of the second input pulse, the coupling from 6 operates, and the extreme left-hand rectifier of the row 4 is triggered to "on," rectifier 6 remaining at "on." The positive peaks of the wave trains in 2 should not have enough amplitude to restore any of the rectifiers to "off" when once "on," and to this end, the bias voltages should not be midway between "on" and "off," but much nearer to the "on" position. Successive input pulses then trigger successive rectifiers of group 4 to "on," all previous ones remaining at "on." After nine pulses, all the rectifiers of 6 and 4 are at "on"; the tenth pulse triggers rectifier 9 to "on"; and as the resulting current change has been arranged to be substantially greater than the total current changes in all previous rectifiers between "on" and "off," the common impedance of circuit 2, 3 can be arranged to produce at this moment a positive pulse sufficient to restore all the previous nine rectifiers to "off." It has been found that a rectifier under the conditions of rectifier 9 and with a series resistance of about 1000 ohms shunted by about 50 micro-micro-farads, when triggered from "off" to "on" can be made to act as a self-restoring trigger device, one period of a relaxation oscillation being produced, followed by a return to the "off" position. Thus all rectifiers will now be at "off." The self-restoring of rectifier 9 from "on" to "off" will produce a negative pulse in choke 2 quite insufficient to retrigger any of the previous rectifiers to "on," because the capacitor 11 limits the rate of reduction of current through rectifier 9, since this rectifier will have a relatively high internal impedance when in the "off" condition.

An output pulse may be obtained from electrode 9 through a blocking capacitor 15 when the rectifier 9 is triggered and restored, this output pulse then corresponding to ten input pulses. The eleventh input pulse will evidently re-start an exactly similar cycle.

The values of elements 10 and 11, with the other constants, should be adjusted so that rectifier 9 is restored in less than the total period of 10 input pulses.

The device of Fig. 1 will operate as a substantially aperiodic pulse counter at all input speeds up to about 20 megacycles per second.

Fig. 2 shows a modification of Fig. 1 adapted for the case in which coupling between adjacent cat whisker electrodes is negative, triggering being as before in the left-right direction of the figure. This arrangement also has the advantage of giving a more constant load on the polarising sources.

Those elements of Fig. 2 which are the same as in Fig. 1 are given the same designation numbers. In this case the eight central electrodes are divided alternately into two groups 4a and 4b, and an additional source 16 is connected between the sources 5 and 12, so that the electrodes of group 4a have a larger positive bias than those of group 4b. The source 8 is omitted, and the resistor 7 is now connected to an intermediate point of the source 5.

The voltage sources should be so adjusted that initially all the odd numbered rectifiers, counting from the left, except 6, are in the "on" condition and with (say) 0.05 volt of being triggered to "off," while all the even numbered rectifiers are at "off" and within 0.05 volt of being triggered to "on," when the adjacent rectifier on the left of each is in the reverse of this initial condition.

Rectifier 6 should be within 0.05 volt of being triggered to "off" with all the other rectifiers in their initial conditions.

The first input pulse applied through capictor 13 thus triggers rectifiers 6 only, from "on" to "off," the first half-cycle of the damped train in coil 2 being operative (assuming positive input pulses). The coupling being negative, the left hand rectifier of group 4a will be primed so that it is brought nearer to the triggering point from "off" to "on." The second input pulse is then able to trigger the left-hand rectifier of group 4a from "off" to "on," rectifier 6 remaining at "off," the second half-cycle of the damped train being operative. This then primes the left hand rectifier of group 4b in like manner, and it will be seen that successive pulses trigger successive rectifiers alternately from "on" to "off" and from "off" to "on," the first and second half-cycle of the damped train being operative alternately. The final rectifier 9 is triggered by the tenth input pulses from "off" to "on" as in Fig. 1, and the damped train arising from this action in the common impedance of circuit 2, 3 restores all the other rectifiers to their initial conditions, the first and second half-cycles of the damped train being used alternately at successive rectifiers in this action. Rectifier 9 then restores itself to "off" without retriggering any of the other rectifiers, as described in connection with Fig. 1.

It will be evident to those skilled in the art that the bias potential in Fig. 2 could alternatively be arranged so that the odd numbered rectifiers counting from the left hand and are initially in the "off" condition, and the even-numbered rectifiers are initially in the "on" condition. In that case rectifier 6 should be biased nearer to the "on" condition than the first rectifier of the group 4a biased to the "off" condition, so that only the rectifier 6 will be triggered by the first incoming pulse. Likewise in Fig. 1, in the initial condition all the rectifiers could be biased to "on" instead of "off" in which case the rectifiers 6 must be biased nearer to the "off" condition than the others.

While the principles of the invention have been described above in connection with specific embodiments, and particular modifications thereof, it is to be clearly understood that this description is made only by way of example, and not as a limitation on the scope of the invention.

What we claim is:

1. An electric pulse counting device comprising a body of semiconducting material having a base electrode making low resistance non-rectifying contact with one surface of the body, and a plurality of rectifying electrodes making rectifying contact with another surface of the body, each rectifying contact being formed to have a negative resistance region, means for biasing said rectifiers for operation through the negative resistance region and any pair of adjacent rectifying electrodes being so spaced that when the corresponding rectifying contacts are passing current in the forward direction, a change in current through one contact produces a change in current through the other.

2. A device according to claim 1 in which the semiconducting material comprises N-type germanium.

3. A device according to claim 1, and further comprising biasing means applied to said rectifying contacts, whereby an increase in current through a rectifying contact produces an increase in current through the adjacent rectifying contact.

4. The device according to claim 1 and further comprising means for biasing said rectifying contacts, to produce an increase in current through a rectifying contact in response to a decrease in current through an adjacent rectifying contact.

5. An electric pulse counting circuit comprising a device according to claim 3, in which all the rectifier contacts are arranged as separate two-condition trigger devices, means for biasing all the rectifying contacts in the forward direction so that all are in the same initial condition, the first contact of the series being biased nearer to the point of triggering to the opposite condition than the others, means for applying a train of pulses to the base electrode so that the first pulse triggers only the first rectifying contact to the opposite condition, thereby priming the second rectifying contact to be triggered to the opposite condition by the second pulse, each succeeding rectifying contact being triggered thereafter priming the next one to be triggered to the opposite condition by the next incoming pulse, and means for deriving an output pulse from the last rectifying contact of the series.

6. An electric pulse counting circuit comprising a device according to claim 4, in which all the rectifying contacts are arranged as two-condition trigger devices, means for biasing all the rectifying contacts in the forward direction so that all the odd-numbered contacts of the series are initially in the first condition, and all the even-numbered contacts of the series are initially in the second condition, the first contact of the series being biased nearer to the point of triggering to the opposite condition than the others, means for applying a train of pulses to the base electrode so that the first pulse triggers only the first rectifying contact to the opposite condition thereby priming the second rectifying contact to be triggered to the opposite condition by the second pulse, each rectifying contact after being triggered priming the next one to be triggered to the opposite condition by the next incoming pulse, and means for deriving an output pulse from the last rectifying contact of the series.

7. A counting circuit according to claim 5 comprising means for causing the current change produced by the triggering of the last rectifying contact to restore all the rectifying contacts to the initial condition.

8. A counting circuit according to claim 5 comprising a tuned circuit connected in series between the base electrode and the source for biasing the rectifier contacts, the arrangement being such that the incoming pulses shock-excite the tuned circuit, the oscillations of which effect the triggering of the respective rectifier contacts.

References Cited in the file of this patent

UNITED STATES PATENTS

| 2,533,001 | Eberhard | Dec. 5, 1950 |
| 2,655,607 | Reeves | Oct. 13, 1953 |
| 2,666,150 | Blakely | Jan. 12, 1954 |